US012664885B2

(12) United States Patent
Guo et al.

(10) Patent No.: US 12,664,885 B2
(45) Date of Patent: Jun. 23, 2026

(54) TRAFFIC DATA WAREHOUSE CONSTRUCTION METHOD AND APPARATUS, STORAGE MEDIUM, AND TERMINAL

(71) Applicants: China TransInfo Technology Co., Ltd., Beijing (CN); Beijing PalmGo Infotech Co., Ltd., Beijing (CN)

(72) Inventors: Shengmin Guo, Beijing (CN); Yuncai Li, Beijing (CN); Zhenzhen Yang, Beijing (CN); Ruilong Zhang, Beijing (CN); Zhi Li, Beijing (CN); Qiaowei Nie, Beijing (CN); Shudong Xia, Beijing (CN)

(73) Assignees: CHINA TRANSINFO TECHNOLOGY CO., LTD., Beijing (CN); BEIJING PALMGO INFOTECH CO., LTD., Beijing (CN)

( * ) Notice: Subject to any disclaimer, the term of this patent is extended or adjusted under 35 U.S.C. 154(b) by 284 days.

(21) Appl. No.: 18/014,048

(22) PCT Filed: Dec. 6, 2021

(86) PCT No.: PCT/CN2021/135717

§ 371 (c)(1),
(2) Date: Mar. 14, 2025

(87) PCT Pub. No.: WO2022/143017

PCT Pub. Date: Jul. 7, 2022

(65) Prior Publication Data

US 2023/0267830 A1 Aug. 24, 2023

(51) Int. Cl.
*G08G 1/01* (2006.01)

(52) U.S. Cl.
CPC ......... *G08G 1/0133* (2013.01); *G08G 1/0116* (2013.01)

(58) Field of Classification Search
CPC ........................... G08G 1/0133; G08G 1/0116
(Continued)

(56) References Cited

U.S. PATENT DOCUMENTS

| | | | | |
|---|---|---|---|---|
| 7,768,427 B2 * | 8/2010 | Manor | ..................... | G08G 1/04 340/904 |
| 10,991,242 B2 * | 4/2021 | Taylor | ..................... | H04Q 9/00 |

(Continued)

FOREIGN PATENT DOCUMENTS

| | | |
|---|---|---|
| CN | 103530995 A | 1/2014 |
| CN | 110334232 A | 10/2019 |

(Continued)

OTHER PUBLICATIONS

International Search Report dated Mar. 2, 2022 received in International Application No. PCT/CN2021/135717.

(Continued)

*Primary Examiner* — Naomi J Small
(74) *Attorney, Agent, or Firm* — Scully, Scott, Murphy & Presser, P.C.

(57) ABSTRACT

Disclosed are a traffic data warehouse construction method, a storage medium, and a terminal. The method includes: creating a target monitoring task based on a creation instruction; loading a monitoring object and spatial range corresponding to the target monitoring task, and obtaining a sampling unit set of the monitoring object; calculating a spatial attribution relationship between a spatial range of each sampling unit in the sampling unit set and the spatial range of the target monitoring task, and determining a spatial coupling relationship; setting a label of the monitoring object based on the spatial coupling relationship, generating a labeled monitoring object, inputting the labeled monitoring object to a preset monitoring calculation function, and outputting a calculation result; and configuring the calcula- (Continued)

tion result in the labeled monitoring object, and distributing the configured monitoring object to a task database corresponding to the target monitoring task.

20 Claims, 6 Drawing Sheets

(58) Field of Classification Search
USPC .......................................................... 340/910
See application file for complete search history.

(56) References Cited

U.S. PATENT DOCUMENTS

| | | | | |
|---|---|---|---|---|
| 2007/0273552 | A1* | 11/2007 | Tischer | G08G 1/0965 340/910 |
| 2011/0191128 | A1 | 8/2011 | Chao et al. | |
| 2019/0331701 | A1* | 10/2019 | Polley | G01N 35/0099 |
| 2020/0160692 | A1* | 5/2020 | Tu | G08G 1/0116 |
| 2020/0334625 | A1* | 10/2020 | Li | G06Q 10/0836 |

FOREIGN PATENT DOCUMENTS

| | | | |
|---|---|---|---|
| CN | 111149141 | A | 5/2020 |
| CN | 111192459 | A | 5/2020 |
| CN | 112016018 | A | 12/2020 |
| CN | 112765127 | A | 5/2021 |

OTHER PUBLICATIONS

First Office Action dated Sep. 28, 2021 received in Chinese Patent Application No. 202011640689.6.
Yang, Z. et al., "An Extraction Method for Traffic Flow Trend Based on Floating Car Data", Journal of Highway and Transportation Research and Development, Dec. 2013, pp. 125-131, vol. 30, No. 12.

* cited by examiner

TRAFFIC DATA WAREHOUSE CONSTRUCTION METHOD AND APPARATUS, STORAGE MEDIUM, AND TERMINAL

CROSS-REFERENCE TO RELATED APPLICATIONS

This application claims priority to Chinese Patent Application No. 202011640689.6, filed on Dec. 31, 2020, in China National Intellectual Property Administration and entitled "Traffic Data Warehouse Construction Method and Apparatus, Storage Medium, and Terminal", the contents of which are hereby incorporated by reference in its entirety.

TECHNICAL FIELD

The present disclosure relates to the technical field of smart transport, and particularly to a traffic data warehouse construction method and apparatus, a storage medium, and a terminal.

BACKGROUND ART

Although the level of traffic informatization has made a great progress, an informatization platform for road network operation management and service is generally integrated by a slightly low degree with a system decentralized and data not collected, barriers of trans-regional, cross-level and inter-departmental information transmission, resource sharing and service linkage are prominent, and it is difficult to ensure the overall efficiency of road network operation, provide accurate service on the way, and guarantee efficient emergency responses. In addition, with the rapid development and maturity of cloud computing, big data, Internet of things, Artificial Intelligence (AI), and other technologies, as well as the layout of a large number of traffic sensing devices, a technology and data condition for achieving an all-region high-accuracy road network operation monitoring capability have gotten mature. Against this background, constructing a technology platform oriented to road network operation management and service on the basis of multi-source heterogeneous traffic big data is the only way to solve current traffic informatization problems in China.

In the context of big data, the service platform is required to be constructed at the core of data on the basis of the idea that data drives services. The organization efficiency of background data will directly affect the expansibility of a service and determine the vitality of the platform. For example, a road network operation monitoring service, the most important service of the road network operation management and service platform, involves numerous monitoring objects, such as various Points of Interest (POIs) of an administrative region, a road section, a toll station, and a service area, each object including a plurality of different monitoring indexes. In addition, different monitoring tasks correspond to different monitoring service types, time-space ranges, monitoring objects, monitoring indexes, etc. Further, there are complex coupling relationships between a monitoring object and a monitoring time-space range, between a monitoring service and a monitoring index, and between different monitoring tasks. This presents a great challenge to the construction of the road network operation management and service platform.

SUMMARY

Embodiments of the present application provide a traffic data warehouse construction method and apparatus, a storage medium, and a terminal. In order to basically understand some aspects of the disclosed embodiments, the following provides a brief summary. This summary is not intended as a general comment and to identify key/important components or describe the scope of protection of these embodiments. The only objective of the summary is to simply present some concepts as a preface to the following detailed description.

In a first aspect, one or more embodiments of the present application provide a traffic data warehouse construction method, including:

- creating, when a monitoring task creation instruction is received, a target monitoring task based on the monitoring task creation instruction;
- loading a monitoring object corresponding to a monitoring object type parameter set in the target monitoring task, and obtaining a sampling unit set of the monitoring object;
- obtaining a target monitoring task spatial range corresponding to a monitoring task spatial range parameter set in the target monitoring task;
- calculating a spatial attribution relationship between a spatial range of each sampling unit in the sampling unit set and the target monitoring task spatial range;
- determining a spatial coupling relationship between the monitoring object and the target monitoring task according to the spatial attribution relationship;
- setting a calculation label and task label of the monitoring object based on the spatial coupling relationship, and generating a labeled monitoring object;
- inputting the labeled monitoring object to a preset monitoring calculation function, and outputting a monitoring index calculation result; and
- configuring the monitoring index calculation result to the labeled monitoring object, and distributing the configured monitoring object to a task database corresponding to the target monitoring task.

Optionally, the calculating a spatial attribution relationship between a spatial range of each sampling unit in the sampling unit set and the target monitoring task spatial range includes:

- obtaining a first spatial attribute description of the target monitoring task spatial range;
- obtaining a second spatial attribute description of each sampling unit in the sampling unit set; and
- labeling each sampling unit as belonging to the target monitoring task when the second spatial attribute description belongs to the first spatial attribute description.

Optionally, the calculating a spatial attribution relationship between a spatial range of each sampling unit in the sampling unit set and the target monitoring task spatial range includes:

- obtaining a first spatial attribute description of the target monitoring task spatial range;
- obtaining a second spatial attribute description of each sampling unit in the sampling unit set when the first spatial attribute description of the target monitoring task spatial range is a first geometric figure, the second spatial attribute description including a second geometric figure, and the geometric feature including points, lines, and planes;
- inputting the first geometric figure and the second geometric figure to a preset correlation judgment function, and outputting a judgment result; and
- labeling each sampling unit as belonging to the target monitoring task when the judgment result is true.

Optionally, the determining a spatial coupling relationship between the monitoring object and the target monitoring task according to the spatial attribution relationship includes:

determining that the monitoring object and the target monitoring task are spatially uncoupled when the spatial range corresponding to each sampling unit does not belong to the target monitoring task spatial range; or, determining that the monitoring object and the target monitoring task are spatially coupled when the spatial range corresponding to each sampling unit belongs to the target monitoring task spatial range; or, determining that the monitoring object and the target monitoring task are partially spatially coupled when the spatial range corresponding to at least one sampling unit belongs to the target monitoring task spatial range.

Optionally, the setting a calculation label and task label of the monitoring object based on the spatial coupling relationship includes:

when the monitoring object and the target monitoring task are spatially coupled, obtaining the task label of the monitoring object, and adding the target monitoring task to the task label of the monitoring object; or, when the monitoring object and the target monitoring task are partially spatially coupled, obtaining a sampling unit set corresponding to a part coupled with the target monitoring task in the monitoring object, and generating a target monitoring object, setting a task label of the target monitoring object as that of the target monitoring task, and updating a calculation label of a sampling unit corresponding to the target monitoring object.

Optionally, the method further includes:

obtaining a life cycle set in the target monitoring task, the life cycle including begin time of the task and end time of the task; and clearing a task label in the task label in the configured monitoring object when the end time is consistent with current time.

Optionally, the creating, when a monitoring task creation instruction is received, a target monitoring task based on the monitoring task creation instruction includes:

extracting a plurality of parameters contained in the monitoring task creation instruction when the monitoring task creation instruction is received;

obtaining a preset monitoring task defining template; and associating the plurality of parameters with an Identifier (ID) in the monitoring task defining template to generate the target monitoring task, the monitoring task defining template being $tsk = \langle id, (t_{bgn}, t_{end}), \Omega_{mo.type}, TSD \rangle$, where id identifies a monitoring task tsk, $(t_{bgn}, t_{end})$ represent begin time and end time of the task respectively, defining a life cycle of the task, $\Omega_{mo.type}$ represents the types of monitoring objects defined by the task, and TSD represents spatial range parameters.

In a second aspect, one or more embodiments of the present application provide a computer storage medium, storing a plurality of instructions suitable for a processor to load and execute to implement the blocks of the above-mentioned method.

In a third aspect, one or more embodiments of the present application provide a terminal, which may include a processor and a memory. The memory stores a computer program suitable for the processor to load and execute to implement the blocks of the above-mentioned method.

The technical solutions provided in the embodiments of the present application may have the following beneficial effects.

It is to be understood that the above general description and the following detailed description are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the specification, serve to explain the principle of the present disclosure.

DETAILED DESCRIPTION OF THE EMBODIMENTS

The following description and the drawings adequately show specific implementation solutions of the present disclosure for those skilled in the art to practice.

Clearly, the described embodiments are not all but only part of embodiments of the present disclosure. All other embodiments obtained by those of ordinary skill in the art based on the embodiments in the present disclosure without creative work shall fall within the scope of protection of the present disclosure.

When the following descriptions involve the drawings, the same numerals in different drawings represent the same or similar elements, unless otherwise indicated. Implementation modes described in the following exemplary embodiments do not represent all implementation modes consistent with the present disclosure. Instead, they are merely examples of a system and method consistent with some aspects of the present disclosure described in detail in the appended claims.

It is to be understood that in the description of the present disclosure, terms "first", "second", etc., are only for a purpose of description and cannot be understood as indicating or implying relative importance. Those of ordinary skill in the art can understand specific meanings of these terms in the present disclosure according to specific situations. In addition, in the description of the present disclosure, "multiple" means two or more than two, unless otherwise stated. "And/or" describes an association between associated objects and represents that three relationships may exist. For example, A and/or B may represent three conditions: existence of only A, existence of both A and B, and existence of only B. Character "/" usually represents that previous and next associated objects form an "or" relationship.

How to efficiently organize and manage background data to better support capability expansion of a service platform for further adaptation to diversified road network management tasks is a subject worthy of study.

The present application provides a traffic data warehouse construction method and apparatus, a storage medium, and a terminal, so as to solve the problems in the related art. In one embodiment of the present application, coupling relationships in a road network operation management service are reduced based on labeling, so that calculation requirements of different monitoring tasks for monitoring index data can be met flexibly at a background data layer, coupling problems in monitoring data calculation are solved, and system service efficiency is improved. Detailed description will now be made with exemplary embodiments.

Figure 1:
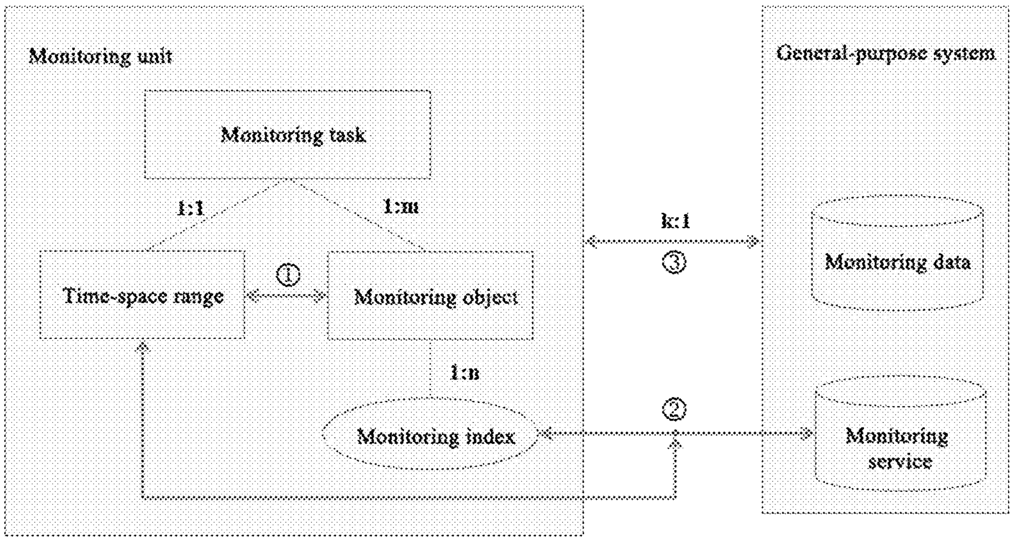
FIG. 1 shows a road network operation monitoring service model according to an embodiment of the present application.

For example, as shown in FIG. 1, FIG. 1 shows a road network operation monitoring service model. Further analysis of FIG. 1 shows that there are multiple coupling relationships inside a monitoring unit and between the monitoring unit and a general-purpose system.

Figure 2:
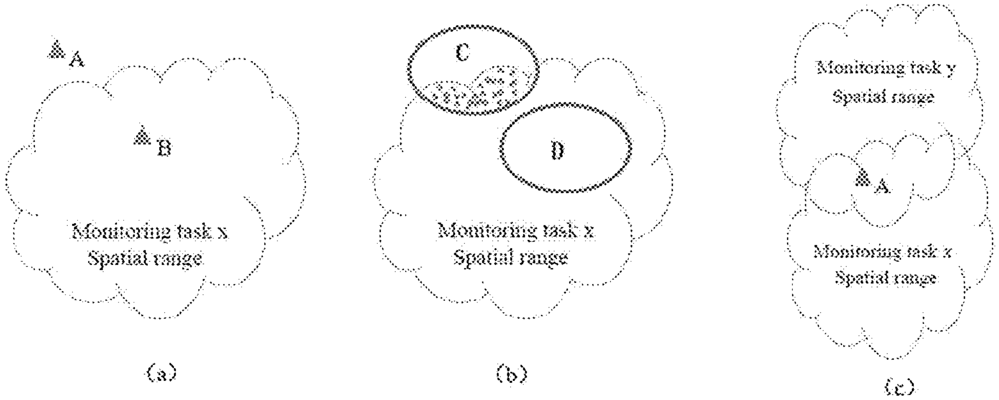
FIG. 2 shows diagrams of coupling relationships in a road network operation monitoring service according to an embodiment of the present application.

First, as shown by coupling relationship ① in FIG. 1, a monitoring object is required to satisfy a constraint of a time-space range. As shown in (a) in FIG. 2, for two point objects A and B of the same type, A does not satisfy a constraint of a spatial range of monitoring task x but B does, so that B is added to a data requirement of monitoring task x on the general-purpose system.

Then, as shown by coupling relationship ② in FIG. 1, a definition of a time-space range may affect calculation of a monitoring service and a monitoring index in some cases. As shown in (b) in FIG. 2, for two plane objects C and D, a range of object C, compared with object D, is not completely within a spatial range of monitoring task x, so calculation of a monitoring index of object C is limited in the spatial range of task x (the shaded part in the figure).

Finally, as shown by coupling relationship ③ in FIG. 1, there may be a data coupling relationship between different monitoring tasks. As shown in (c) in FIG. 2, point object A spatially belongs to both task x and task y. In order to avoid repeated calculation, it is necessary to consider how to share a result of point object A between the tasks.

In summary, a service characteristic of a road network operation management and service platform determines that various coupling relationships may inevitably encountered during construction of the platform, which brings great challenges to the flexibility of tasks and the calculation efficiency of the platform. Dealing with the coupling relationships effectively during organization of background data will extend a service capability of the platform greatly. Therefore, the present disclosure proposes a traffic data warehouse construction method oriented to road network operation management, to solve coupling problems in monitoring data calculation.

Figure 3:
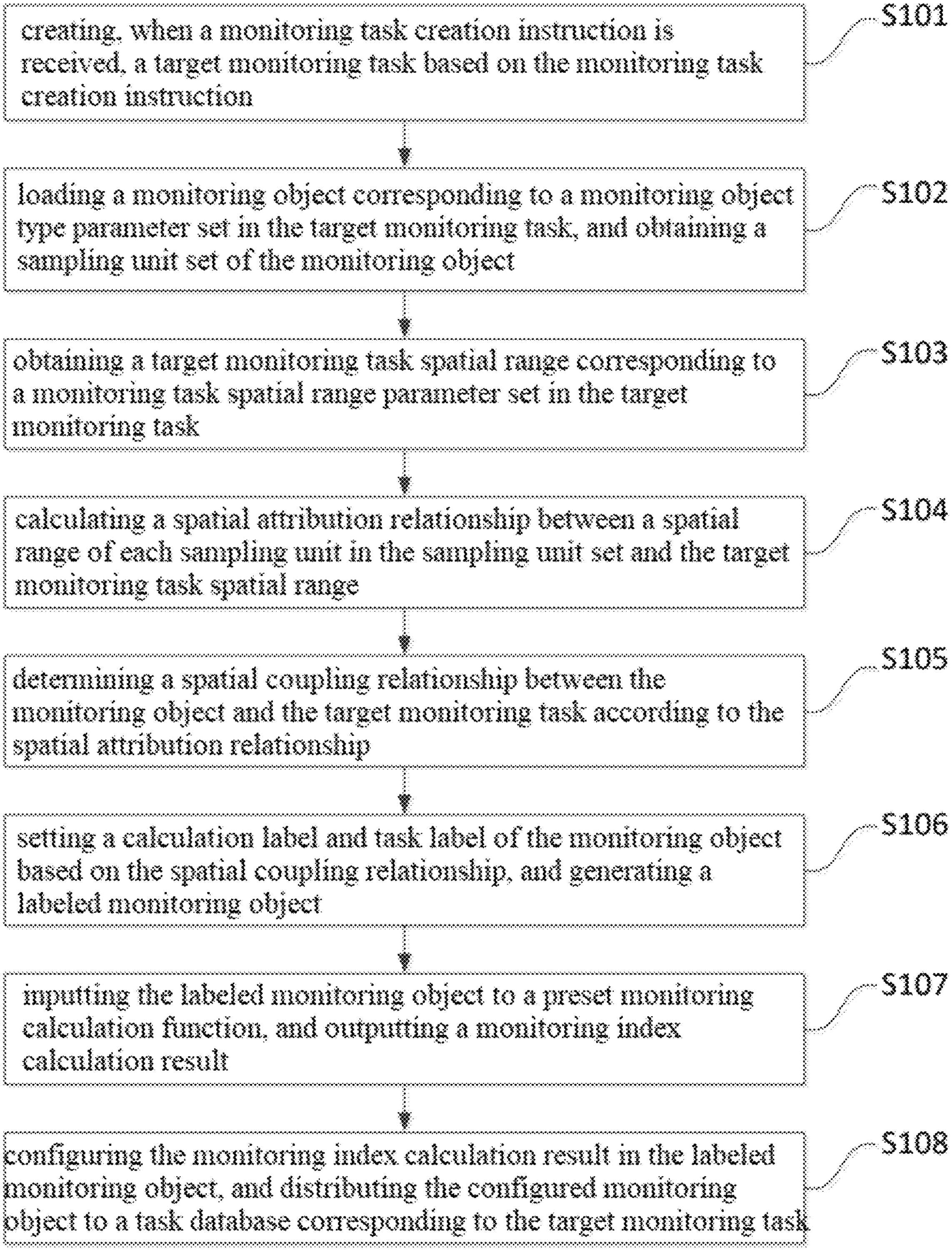
FIG. 3 is a schematic flowchart of a traffic data warehouse construction method according to an embodiment of the present application.
Figure 4:
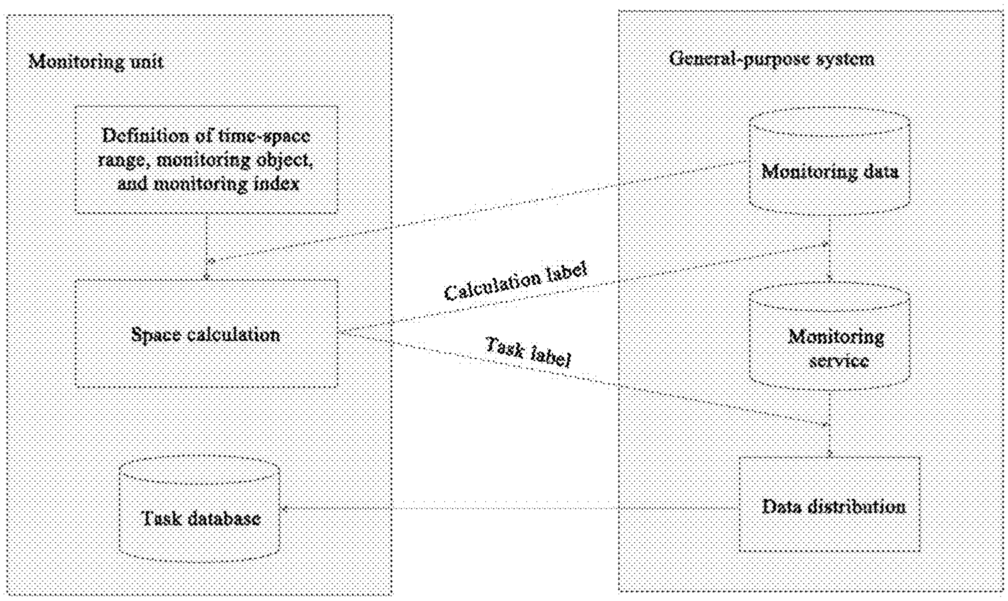
FIG. 4 is a schematic diagram of a traffic data warehouse construction process according to an embodiment of the present application.
Figure 5:
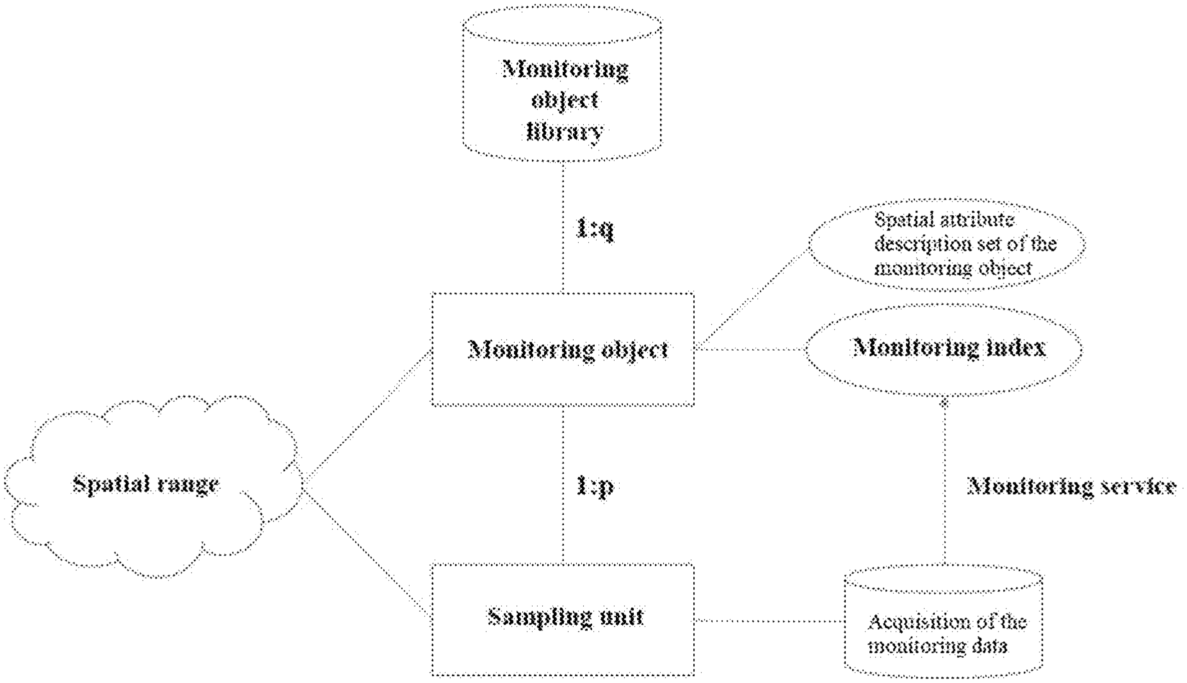
FIG. 5 is a schematic diagram of a logic model of a monitoring object according to an embodiment of the present application.

The traffic data warehouse construction method provided in the embodiments of the present application will now be introduced in detail in combination with FIGS. 3 to 5. The method may be implemented based on a computer program and run in a Von Neumann system-based traffic data warehouse construction apparatus. The computer program may be integrated into an application or run as an independent tool application.

FIG. 3 is a schematic flowchart of a traffic data warehouse construction method according to an embodiment of the present application. As shown in FIG. 3, the method of the embodiment of the present application may include the following blocks.

In S101, when a monitoring task creation instruction is received, a target monitoring task is created based on the monitoring task creation instruction.

The monitoring task creation instruction is an instruction input by a user to a client, and the instruction contains a plurality of parameters for creation of a monitoring task. The plurality of parameters include an ID of the monitoring task, a life cycle parameter of the monitoring task, a type parameter of monitoring objects in the monitoring task, and a spatial range parameter of the monitoring task.

Specifically, the plurality of parameters consists of the ID of the monitoring task, a life cycle of the monitoring task, a type of the monitoring object in the monitoring task, and a spatial range of the monitoring task respectively.

In general, the created monitoring task may be defined as tsk=⟨ id, $(t_{bgn}, t_{end})$, $\Omega_{mo.type}$, TSD⟩ , where id identifies the monitoring task tsk, $(t_{bgn}, t_{end})$ represent begin time and end time of the monitoring task respectively, defining the life cycle of the monitoring task, and $\Omega_{mo.type}$ represents a type set of the monitoring object defined by the monitoring task, and TSD represents a spatial range parameter of the target monitoring task tsk.

In a possible implementation mode, when a monitoring task is created, the user first determines a plurality of parameters of the monitoring task, input the plurality of parameters to the client, and then triggers a monitoring task creation function. After the monitoring task creation function is triggered, a user terminal receives a monitoring task creation instruction, and extracts the plurality of parameters contained in the monitoring task creation instruction. Then, a preset monitoring task defining template tsk is obtained. Finally, the plurality of parameters are associated with an ID in the monitoring task defining template tsk one by one to generate a final target monitoring task.

In S102, a monitoring object corresponding to a monitoring object type parameter set in the target monitoring task is loaded, and a sampling unit set of the monitoring object is obtained.

The set monitoring object type parameter is a parameter $\Omega_{mo.type}$ in tsk created in block S101. The monitoring object belongs to the monitoring task, and a monitoring task may include a plurality of monitoring objects. The sampling unit set belongs to the monitoring object, and a monitoring object includes one or more sampling units.

Understandably, the acquisition unit includes a congestion sensor, a speed measuring device, a video acquisition device, a radar device, and the like.

In general, for example, as shown in FIG. 5, FIG. 5 shows a logic model of a monitoring object. The monitoring object may be defined as mo=⟨ id, type, name, SD, MI, TT⟩ , where id uniquely identifies the monitoring object; type represents a type of the monitoring object, such as an administrative region, a highway, and a POI; and name represents a name of the monitoring object.

SD=(admin, road, coord, . . . ) represents a spatial attribute description set of the monitoring object, where admin represents a description of an administrative region that the object belongs to, such as Shandong Province and Jinan City; road represents a name of a road where the object is located, such as Beijing-Shanghai expressway and national highway 301; and coord represents a description of a Geographic Information System (GIS) attribute of the object. A point object is a coordinate, a line object is a coordinate point sequence, and a plane object is a point sequence coordinate set of a boundary thereof.

MI=($\delta_1$, $\delta_2$, . . . , $\delta_k$) represents a monitoring index set of the monitoring object, there being a fixed index set for each type of monitoring objects. For example, for a province, there are indexes such as a population, a traffic flow, and a congestion index; and for a toll station, there are indexes such as a freight car flow, a passenger car flow, a car flow using Electronic Toll Collection (ETC) equipments, and a congested queue distance. Indexes for different types of monitoring objects are different.

TT=($tsk_1$, $tsk_2$, . . . , $tsk_m$) represents a task label corresponding to the object mo defined in the present disclosure, referring to that the monitoring object mo and monitoring indexes thereof are required by a plurality of monitoring tasks tsk.

It is to be pointed out that except the TT attribute defined in the present disclosure, the monitoring object mo and the other attributes are preset rather than calculated by a system of the present disclosure. All known monitoring objects are stored in a monitoring object library.

In general, a sampling unit may be represented as su=⟨ id, type, name, SD, DI, OT⟩ , where id uniquely identifies the sampling unit; type defines a type of the sampling unit, such as a congestion sensor or a flow sensor; and name represents a name of the sensor.

SD=(admin, road, coord, . . . ) represents a spatial attribute description set of the sensor, whose meaning is the same as that of the monitoring object and will not be elaborated herein.

DI=($\gamma_1$, $\gamma_2$, . . . , $\gamma_k$) represents a monitoring data set that the sampling unit is able to acquire. For example, for a congestion sensor such as a road section, there are indexes such as a congestion level, an average travel speed, travel time, and a queue length; and for a flow sensor such as a toll station, there are indexes such as a total flow, flows of different vehicle types, and flows of different toll types.

OT=($mo_1$, $mo_2$, . . . , $mo_m$) represents a calculation label corresponding to the sampling unit su defined in the present disclosure, referring to that monitoring data provided by su is required by the index calculation of the monitoring object mo as an input.

It should be pointed out that the relationship, expressed by OT, between the monitoring object mo and the sampling unit su is preset usually by spatial attribute association. If there is an attribute association between su.SD and mo.SD, mo→su.OT is set. For example, if a congestion index of a provincial-level administrative region mo is to be calculated, it is necessary to make summary statistics on congestion conditions of all road sections su in this province. In such case, an association between mo and su may be extracted automatically based on the SD.admin attribute of the road section su and stored in su.OT.

In an embodiment after the target monitoring task is created based on block S101, a plurality of monitoring objects mo corresponding to a parameter value $\Omega_{mo.type}$ in the created monitoring task are obtained based on the parameter value, and a plurality of sampling units $\Omega_{mo}$ corresponding to the monitoring object mo are finally obtained.

In S103, a target monitoring task spatial range corresponding to a monitoring task spatial range parameter set in the target monitoring task is obtained.

In general, coupling relationships in a road network operation management service are reduced based on labeling in the present disclosure. Calculation labels are defined for monitoring data to deal with a coupling relationship between time-space range definition and monitoring index calculation (coupling relationship ② in FIG. 1). Task labels are defined for monitoring objects to deal with a coupling relationship between a monitoring object and a time-space range (coupling relationship ① in FIG. 1) and a coupling relationship between monitoring objects in different monitoring tasks (coupling relationship ③ in FIG. 1).

As shown in FIG. 4, a task database is configured for each monitoring task, and all monitoring object index data required by the task is stored in the task database. It is to be noted that the monitoring object index data required by the monitoring task refers to index data of a monitoring object corresponding to the monitoring task. Therefore, not only may data coupling between different tasks be reduced, but also task data may be accessed conveniently. A calculation label and task label related to the task are calculated by combining space calculation in a monitoring unit and a state of the monitoring object in monitoring data of a general-purpose system, and are transmitted to the general-purpose system. Acquisition of the monitoring data and index calculation (i.e., implementation of a monitoring service) are both performed in a unified manner in the general-purpose system. As a parameter of the monitoring service, the calculation label may maximally maintain the identity of the monitoring data and an index calculation method. In addition, a task-label-based data distribution mechanism distributes monitoring indexes calculated in a unified manner to databases of different monitoring tasks Therefore, the calculation efficiency may be improved, and data coupling relationships between different monitoring tasks may be dealt with.

It can be understood that the general system in this embodiment refers to the data computing center. It can be understood that the general system also includes the general computing method of monitoring indicators, which can be calculated according to the equipment, for all data storage and computing, and for all monitoring task services.

In summary, as shown in FIG. 4, construction of a traffic data warehouse requires two aspects of work: one aspect is implemented inside the monitoring unit, and the other aspect is implemented by construction of the general-purpose system. A traffic data warehouse with high task flexibility may be constructed by combining the two aspects closely, so as to maintain the vitality of the road network operation management and service platform.

In S104, a spatial attribution relationship between a spatial range of each sampling unit in the sampling unit set and the target monitoring task spatial range is calculated.

In general, the sampling unit set corresponding to the monitoring object mo is $\Omega_{mo}$, the spatial range of each sampling unit su in $\Omega_{mo}$ may be represented as su.SD (su$\in\Omega_{mo}$), and a sampling unit spatial range parameter may be invoked based on su.SD. The target monitoring task spatial range may be represented as tsk. TSD, TSD representing a spatial range parameter of the target monitoring task tsk, and the spatial range parameter of the target monitoring task may be invoked based on sk. TSD.

In a possible implementation mode, a first spatial attribute description of the target monitoring task spatial range is obtained first. Then, a second spatial attribute description of each sampling unit in the sampling unit set is obtained. Finally, each sampling unit is labeled as belonging to the target monitoring task when the second spatial attribute description belongs to the first spatial attribute description.

For example, if the target monitoring task spatial range is a description of an administrative region such as Shandong Province and Jinan City, or a name of a road where the object is located such as Beijing-Shanghai expressway and national highway 301, a spatial description (including a description of an administrative region and a description of a corresponding road) of the sampling unit is analytically compared with a spatial description (including a description of an administrative region and a name of a corresponding road) of the target monitoring task to determine an attribution therebetween.

For example, the following description may be made with defined characters: if the spatial range of the task is input based on TSD.admin or TSD.road, su.SD.admin and su.SD.road are analytically compared with TSD.admin or TSD.road respectively. If su.SD.admin∈TSD.admin or su.SD.road∈TSD.road is true, su∈ tsk is recorded, otherwise su∉tsk is recorded.

In another possible implementation mode, a first spatial attribute description of the target monitoring task spatial range is obtained. Then, a second spatial attribute description of each sampling unit in the sampling unit set is obtained when the first spatial attribute description of the target monitoring task spatial range is a first geometric figure, the second spatial attribute description including a second geometric figure, and the geometric feature including points, lines, and planes. Next, the first geometric figure and the second geometric figure are input to a preset correlation judgment function, and a judgment result is output. Finally, each sampling unit is labeled as belonging to the target monitoring task when the judgment result is true.

If the spatial range of the task is input based on TSD.coord, it is necessary to perform space geometric calculation according to su.SD.coord and TSD.coord. In the present disclosure, TSD.coord defines a plane region, and su.SD.coord may define a point region, a line region, or a plane region. It is defined here that a correlation between TSD.coord and su.SD.coord is defined by function F(TSD.coord, su.SD.coord). In case of F( )=True, su∈tsk is recorded, otherwise su∉tsk is recorded.

F( ) defines whether su is geometrically in the plane region defined by TSD.coord, such as a ray method for determining whether a point is in the plane region. Elaborations are omitted herein.

In S105, a spatial coupling relationship between the monitoring object and the target monitoring task is determined according to the spatial attribution relationship.

In a possible implementation mode, it is determined that the monitoring object and the target monitoring task are spatially uncoupled when the spatial range corresponding to each sampling unit does not belong to the target monitoring task spatial range; or, it is determined that the monitoring object and the target monitoring task are spatially coupled when the spatial range corresponding to each sampling unit belongs to the target monitoring task spatial range; or, it is determined that the monitoring object and the target monitoring task are partially spatially coupled when the spatial range corresponding to at least one sampling unit belongs to the target monitoring task spatial range.

For example, the partial spatial coupling relationship is as follows: if the monitoring object is a county, and for a specific monitoring task (such as an earthquake), the monitoring object may be only partially within a spatial range of the monitoring task (the earthquake destroys not all but only part of space of the county), so that the monitoring object and the monitoring task are partially spatially coupled.

In summary, a spatial coupling relationship between the monitoring object mo and the task tsk may be obtained by analysis based on the spatial coupling relationship between tsk. TSD and su.SD. There are three conditions as follows.

(1) For any su∈$\Omega_{mo}$, mo∉tsk is recorded in case of su∈tsk, namely the monitoring object is unrelated to the monitoring task.

(2) For any su∈$\Omega_{mo}$, mo∈tsk is recorded in case of su∈tsk, namely the monitoring object is related to the monitoring task.

(3) if there is one or more $su_1$∈$\Omega_{mo}$, $su_1$∈tsk, and there is one or more $su_2$∈$\Omega_{mo}$, $su_2$∉tsk, the monitoring object is partially related to the monitoring task.

In S106, a calculation label and task label of the monitoring object are set based on the spatial coupling relationship, and a labeled monitoring object is generated.

In a possible implementation mode, when the monitoring object and the target monitoring task are spatially coupled, the task label of the monitoring object is obtained, and then the target monitoring task is added to the task label of the monitoring object.

Alternatively, when the monitoring object and the target monitoring task are partially spatially coupled, a sampling unit set corresponding to a part coupled with the target monitoring task in the monitoring object is obtained, a target monitoring object is generated, a task label of the generated target monitoring object is set as that of the target monitoring task, and a calculation label of a sampling unit related to the target monitoring object is updated.

It can be understood that every time when a monitoring object is generated, a calculation label of a sampling unit related to the monitoring object is updated.

For example, in case that mo belongs to tsk, tsk→mo.TT is set, and tsk is added to the task label of the object mo.

In case that mo partially belongs to tsk, a result calculated based on mo cannot be directly used by tsk, and a copying operation is performed on mo to generate a new monitoring object mo'. Further, mo'.TT is cleared first, and then tsk→mo'.TT is set. A calculation label of a sampling unit related to mo' is updated. That is, for sampling unit $su_1$, mo'→$su_1$.OT is set in case of $su_1$∈tsk and $su_1$∈$\Omega_{mo}$. Based on the above setting, all sampling units in a sampling unit set $\Omega_{mo'}$ of the monitoring object mo' are within the spatial range of the task tsk, and a calculation result of mo' only serves the task tsk.

In S107, the labeled monitoring object is input to a preset monitoring calculation function, and a monitoring index calculation result is output.

The monitoring calculation function is $$mo.\delta_k = F^{\delta_k}_{mo.type,su.type}(\Omega_{mo}).$$

$$F^{\delta_k}_{mo.type,su.type}(\ )$$

represents a method for calculating a monitoring object index mo.$\delta_k$ based on the sampling unit set $\Omega_{mo}$ related to the monitoring object mo, where $\Omega_{mo}$={su|mo∈su.OT}. The definition of $$F^{\delta_k}_{mo.type,su.type}(\ )$$

is determined by the type of the monitoring object mo, the type of the sampling unit su, and the index mo.$\delta_k$ required to be calculated. If the three factors are determined, the monitoring calculation function F is uniquely determined.

In a possible implementation mode, according to the definition of the monitoring calculation function $$F^{\delta_k}_{mo.type,su.type}(\Omega_{mo}),$$

for an existing monitoring object mo, if an index value mo.$\delta_k$ is to be statistically obtained, a monitoring index calculation result may be obtained by putting the monitoring object into $$F^{\delta_k}_{mo.type,su.type}(\Omega_{mo});$$

and for a new monitoring object mo', and if an index value mo'.$\delta_k$ is to be statistically obtained, a monitoring index calculation result may be obtained by putting the monitoring object into $$F^{\delta_k}_{mo.type,su.type}(\Omega_{mo'}).$$

Based on the above logic, a diversified spatial coupling relationship between the monitoring task and the monitoring object is calculated without changing the definition of the monitoring calculation function.

In S108, the monitoring index calculation result is configured in the labeled monitoring object, and the configured monitoring object is distributed to a task database corresponding to the target monitoring task.

In a possible implementation mode, index values of all monitoring objects mo are calculated, and a distribution module distributes mo to the task databases of corresponding tsk E mo. TT based on the mo. TT set for a front end of the monitoring task and the service to invoke. Distributed data may be all monitoring object data, or monitoring index values of a specific type, or all index values. Further, each task has a life cycle. If time exceeds time set by tsk.$t_{end}$, tsk labels in all the monitoring objects mo.TT are cleared. If the object mo.TT={ }, it indicates that the object is already invalid, and calculation is not required any more. Specifically, the user terminal obtains a life cycle set in the target monitoring task, the life cycle including begin time of the task and end time of the task; and a task label in the task label in the configured monitoring object is cleared when the end time is consistent with current time.

In one or more embodiments of the present application, the traffic data warehouse construction apparatus first creates, when receiving a monitoring task creation instruction, a target monitoring task based on the monitoring task creation instruction. Then, a monitoring object corresponding to a monitoring object type parameter set in the target monitoring task is loaded, and a sampling unit set of the monitoring object is obtained. Next, a target monitoring task spatial range corresponding to a monitoring task spatial range parameter set in the target monitoring task is obtained. Later on, a spatial attribution relationship between a spatial range of each sampling unit in the sampling unit set and the target monitoring task spatial range is calculated. Then, a spatial coupling relationship between the monitoring object and the target monitoring task is determined according to the spatial attribution relationship. Then, a calculation label and task label of the monitoring object are set based on the spatial coupling relationship, and a labeled monitoring object is generated. Then, the labeled monitoring object is input to a preset monitoring calculation function, and a monitoring index calculation result is output. Finally, the monitoring index calculation result is configured in the labeled monitoring object, and the configured monitoring object is distributed to a task database corresponding to the target monitoring task. In the present application, coupling relationships in a road network operation management service are reduced based on labeling, so that calculation requirements of different monitoring tasks for monitoring index data can be met flexibly at a background data layer, coupling problems in monitoring data calculation are solved, and system service efficiency is improved.

Understandably, in the above embodiment of the application, the spatial range of the target monitoring task and the spatial range of the acquisition unit corresponding to the target monitoring task are acquired, the spatial coupling relationship between the two is calculated, the calculation label and task label of the monitoring object are set according to the calculation results, and then the monitoring index calculation results of the monitoring object are distributed to the task database corresponding to the monitoring task, Set task labels and calculation labels for monitoring objects according to the spatial coupling relationship, so as to reduce the coupling relationship in the road network operation management business based on the labeling method, flexibly meet the calculation requirements of different monitoring tasks on the monitoring index data at the background data level, coupling problems in monitoring data calculation are solved, and system service efficiency is improved.

The below is an apparatus embodiment of the present disclosure that may be configured to execute the method embodiment of the present disclosure. Details undisclosed in the apparatus embodiment of the present disclosure refer to the method embodiment of the present disclosure.

Figure 6:
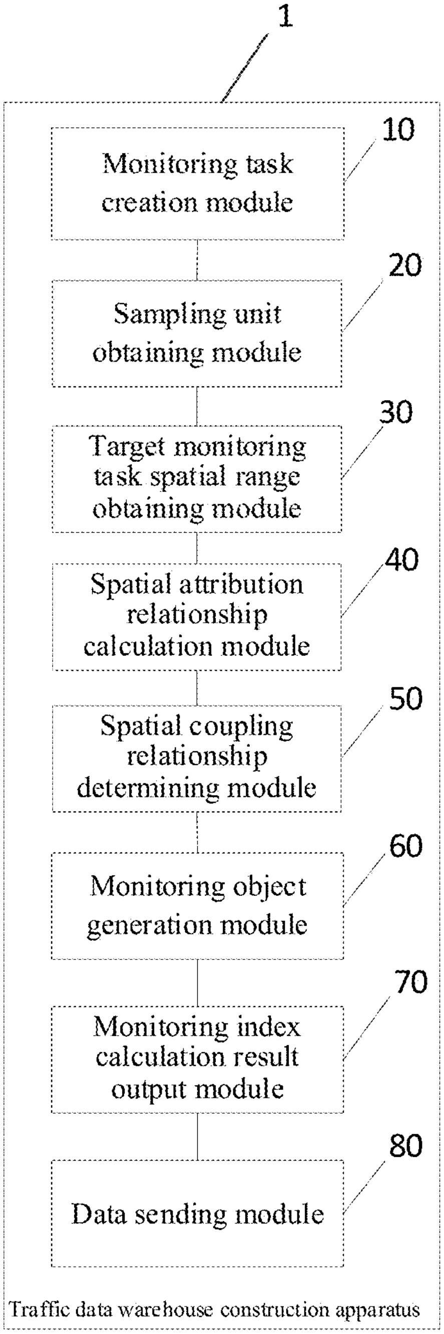
FIG. 6 is a schematic diagram of a traffic data warehouse construction apparatus according to an embodiment of the present application.

Referring to FIG. 6, a schematic structural diagram of a traffic data warehouse construction apparatus according to an exemplary embodiment of the present disclosure is shown. The traffic data warehouse construction apparatus may be implemented into all or part of a smart robot by software, hardware, or a combination thereof. The apparatus 1 includes a monitoring task creation module 10, a sampling unit obtaining module 20, a target monitoring task spatial range obtaining module 30, a spatial attribution relationship calculation module 40, a spatial coupling relationship determining module 50, a monitoring object generation module 60, a monitoring index calculation result output module 70, and a data sending module 80.

The monitoring task creation module 10 is configured to create, when a monitoring task creation instruction is received, a target monitoring task based on the monitoring task creation instruction.

The sampling unit obtaining module 20 is configured to load a monitoring object corresponding to a monitoring object type parameter set in the target monitoring task, and obtain a sampling unit set of the monitoring object.

The target monitoring task spatial range obtaining module 30 is configured to obtain a target monitoring task spatial range corresponding to a monitoring task spatial range parameter set in the target monitoring task.

The spatial attribution relationship calculation module 40 is configured to calculate a spatial attribution relationship between a spatial range of each sampling unit in the sampling unit set and the target monitoring task spatial range.

The spatial coupling relationship determining module 50 is configured to determine a spatial coupling relationship between the monitoring object and the target monitoring task according to the spatial attribution relationship.

The monitoring object generation module 60 is configured to set a calculation label and task label of the monitoring object based on the spatial coupling relationship, and generate a labeled monitoring object.

The monitoring index calculation result output module 70 is configured to input the labeled monitoring object to a preset monitoring calculation function, and output a monitoring index calculation result.

The data sending module 80 is configured to configure the monitoring index calculation result in the labeled monitoring object, and distribute the configured monitoring object to a task database corresponding to the target monitoring task.

It is to be noted that the traffic data warehouse construction apparatus provided in the embodiment is described with division of each of the above-mentioned function modules as an example when performing the traffic data warehouse construction method, and in actual applications, the above-mentioned functions may be allocated to different function modules for completion as required. That is, the internal structure of the apparatus is divided into different function modules to complete all or part of the functions described above. In addition, the traffic data warehouse construction apparatus provided in the embodiment belongs to the same concept as the traffic data warehouse construction method embodiment, and details about an implementation process thereof refer to the method embodiment, and will not be elaborated herein.

The sequence numbers of the embodiments of the present application are only for description and do not represent superiority-inferiority of the embodiments.

Those skilled in the art should understand that each module or block of the above embodiments of the disclosure can be implemented by a general computing device, which can be concentrated on a single computing device, or distributed on a network composed of multiple computing devices. Optionally, they can be implemented by the program code executable by the computing device, so that they can be stored in a storage device and executed by the computing device, And in some cases, the blocks shown or described may be executed in a different order than those herein, or they may be fabricated into individual integrated circuit modules, or a plurality of modules or blocks among them may be fabricated into a single integrated circuit module for implementation. In this way, the disclosure is not limited to any specific combination of hardware and software.

In the embodiment of the present application, the traffic data warehouse construction apparatus first creates, when receiving a monitoring task creation instruction, a target monitoring task based on the monitoring task creation instruction. Then, a monitoring object corresponding to a monitoring object type parameter set in the target monitoring task is loaded, and a sampling unit set of the monitoring object is obtained. Next, a target monitoring task spatial range corresponding to a monitoring task spatial range parameter set in the target monitoring task is obtained. Later on, a spatial attribution relationship between a spatial range of each sampling unit in the sampling unit set and the target monitoring task spatial range is calculated. Then, a spatial coupling relationship between the monitoring object and the target monitoring task is determined according to the spatial attribution relationship. Then, a calculation label and task label of the monitoring object are set based on the spatial coupling relationship, and a labeled monitoring object is generated. Then, the labeled monitoring object is input to a preset monitoring calculation function, and a monitoring index calculation result is output. Finally, the monitoring index calculation result is configured in the labeled monitoring object, and the configured monitoring object is distributed to a task database corresponding to the target monitoring task. In the present application, coupling relationships in a road network operation management service are reduced based on labeling, so that calculation requirements of different monitoring tasks for monitoring index data can be met flexibly at a background data layer, coupling problems in monitoring data calculation are solved, and system service efficiency is improved.

The present disclosure also provides a computer-readable medium, storing a program instruction that, when executed by a processor, implements the traffic data warehouse construction method provided in each of the above-mentioned method embodiments.

The present disclosure also provides a computer program product containing an instruction. The computer program product runs in a computer to enable the computer to execute the traffic data warehouse construction method in each of the above-mentioned method embodiments.

Figure 7:
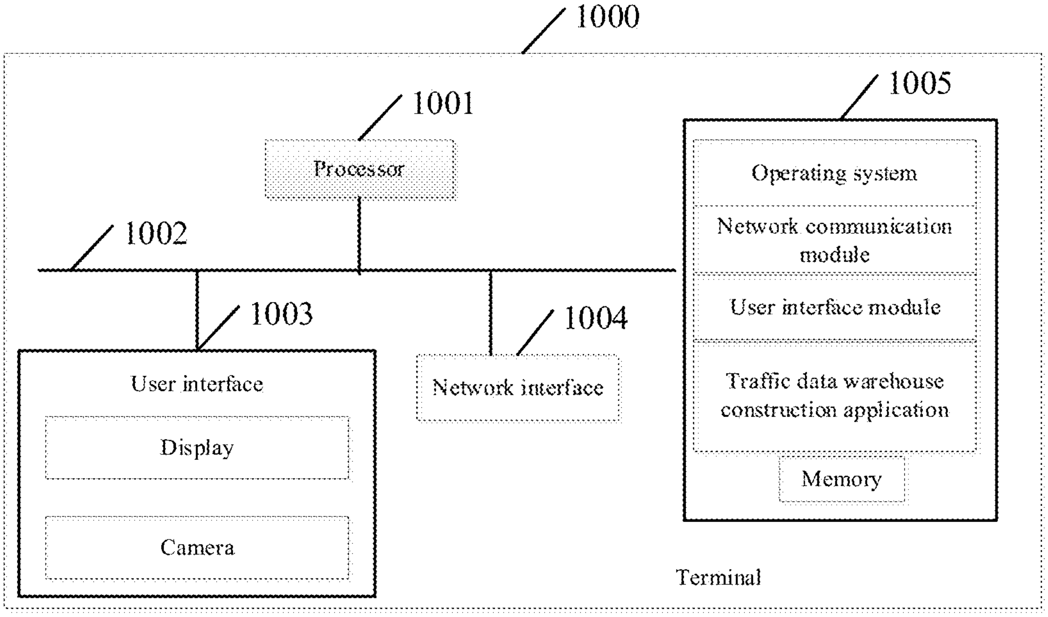
FIG. 7 is a schematic diagram of a terminal according to an embodiment of the present application.

Referring to FIG. 7, a schematic structural diagram of a terminal according to an embodiment of the present application is shown. As shown in FIG. 7, the terminal 1000 may include at least one processor 1001, at least one network interface 1004, a user interface 1003, a memory 1005, and at least one communication bus 1002.

The communication bus 1002 is configured to implement connection communication between these components.

The user interface 1003 may include a display and a camera. Optionally, the user interface 1003 may further include a standard wired interface and wireless interface.

Optionally, the network interface 1004 may include a standard wired interface and wireless interface (such as Wireless Fidelity (WI-FI) interface).

The processor 1001 includes one or more processing cores. The processor 1001 connects each part of the whole electronic device 1000 by use of various interfaces and lines, and executes various functions and data processing of the electronic device 1000 by running or executing an instruction, program, code set, or instruction set stored in the memory 1005 and invoking data stored in the memory 1005. Optionally, the processor 1001 may be implemented by at least one of hardware forms of Digital Signal Processing (DSP), a Field-Programmable Gate Array (FPGA), and a Programmable Logic Array (PLA). The processor 1001 may integrate one or any combination of a Central Processing Unit (CPU), a Graphics Processing Unit (GPU), a modem, etc. The CPU mainly processes an operating system, a user interface, an application, etc. The GPU is configured to render and plot a content to be displayed by the display. The modem is configured to process wireless communication. It can be understood that the modem may also not integrated into the processor 1001 but implemented independently by a chip.

The memory 1005 may include a Random Access Memory (RAM) or a Read-Only Memory (ROM). Optionally, the memory 1005 includes a non-transitory computer-readable storage medium. The memory 1005 may be configured to store an instruction, a program, a code, a code set, or an instruction set. The memory 1005 may include a program storage region and a data storage region. The program storage region may store an instruction for implementing an operating system, an instruction for at least one function (such as a touch function, a sound playing function, and an image playing function), an instruction for implementing each of the above-mentioned method embodiments, etc. The data storage region may store data involved in each of the above method embodiments, etc. Optionally, the memory 1005 may be at least one storage device far away from the processor 1001. As shown in FIG. 7, as a computer storage medium, the memory 1005 may include an operating system, a network communication module, a user interface module, and a traffic data warehouse construction application.

In the terminal 1000 shown in FIG. 7, the user interface 1003 is mainly configured to provide an input interface for a user, and obtain data input by the user. The processor 1001 may be configured to invoke the traffic data warehouse construction application stored in the memory 1005, and specifically execute the following operations:

creating, when a monitoring task creation instruction is received, a target monitoring task based on the monitoring task creation instruction;

loading a monitoring object corresponding to a monitoring object type parameter set in the target monitoring task, and obtaining a sampling unit set of the monitoring object;

obtaining a target monitoring task spatial range corresponding to a monitoring task spatial range parameter set in the target monitoring task;

calculating a spatial attribution relationship between a spatial range of each sampling unit in the sampling unit set and the target monitoring task spatial range;

determining a spatial coupling relationship between the monitoring object and the target monitoring task according to the spatial attribution relationship;

setting a calculation label and task label of the monitoring object based on the spatial coupling relationship, and generating a labeled monitoring object;

inputting the labeled monitoring object to a preset monitoring calculation function, and outputting a monitoring index calculation result; and configuring the monitoring index calculation result to the labeled monitoring object, and distributing the configured monitoring object to a task database corresponding to the target monitoring task.

In an embodiment, the processor 1001, when executing the operation of calculating a spatial attribution relationship between a spatial range of each sampling unit in the sampling unit set and the target monitoring task spatial range, specifically executes the following operations:

obtaining a first spatial attribute description of the target monitoring task spatial range;

obtaining a second spatial attribute description of each sampling unit in the sampling unit set; and labeling each sampling unit as belonging to the target monitoring task when the second spatial attribute description belongs to the first spatial attribute description.

In an embodiment, the processor 1001, when executing the operation of calculating a spatial attribution relationship between a spatial range of each sampling unit in the sampling unit set and the target monitoring task spatial range, specifically executes the following operations:

obtaining a first spatial attribute description of the target monitoring task spatial range;

obtaining a second spatial attribute description of each sampling unit in the sampling unit set when the first spatial attribute description of the target monitoring task spatial range is a first geometric figure, the second spatial attribute description including a second geometric figure, and the geometric feature including points, lines, and planes;

inputting the first geometric figure and the second geometric figure to a preset correlation judgment function, and outputting a judgment result; and labeling each sampling unit as belonging to the target monitoring task when the judgment result is true.

In an embodiment, the processor 1001, when executing the operation of determining a spatial coupling relationship between the monitoring object and the target monitoring task according to the spatial attribution relationship, specifically executes the following operations:

determining that the monitoring object and the target monitoring task are spatially uncoupled when the spatial range corresponding to each sampling unit does not belong to the target monitoring task spatial range; or, determining that the monitoring object and the target monitoring task are spatially coupled when the spatial range corresponding to each sampling unit belongs to the target monitoring task spatial range; or, determining that the monitoring object and the target monitoring task are partially spatially coupled when the spatial range corresponding to at least one sampling unit belongs to the target monitoring task spatial range.

In an embodiment, the processor 1001, when setting the calculation label and task label of the monitoring object based on the spatial coupling relationship, specifically executes the following operations:

when the monitoring object and the target monitoring task are spatially coupled, obtaining the task label of the monitoring object, and adding the target monitoring task to the task label of the monitoring object; or, when the monitoring object and the target monitoring task are partially spatially coupled, obtaining a sampling unit set corresponding to a part coupled with the target monitoring task in the monitoring object, and generating a target monitoring object.

In an embodiment, when the operations of obtaining a sampling unit set corresponding to a part coupled with the target monitoring task in the monitoring object and generating a target monitoring object, the sampling unit set corresponding to the part coupled with the target monitoring task in the monitoring object is obtained, and the target monitoring object is generated for the sampling unit set corresponding to the coupled part, or a copying operation is performed on the sampling unit set corresponding to the coupled part to generate the target monitoring object.

A task label of the target monitoring object is set as that of the target monitoring task, and a calculation label of a sampling unit corresponding to the target monitoring object is updated.

In an embodiment, the processor 1001, when creating, when the monitoring task creation instruction is received, the target monitoring task based on the monitoring task creation instruction, specifically executes the following operations:

extracting a plurality of parameters contained in the monitoring task creation instruction when the monitoring task creation instruction is received;

obtaining a preset monitoring task defining template; and associating the plurality of parameters with an ID in the monitoring task defining template to generate the target monitoring task, the monitoring task defining template being $tsk = \langle id, (t_{bgn}, t_{end}), \Omega_{mo.type}, TSD \rangle$, where id uniquely identifies a monitoring task tsk, $(t_{bgn}, t_{end})$ represent begin time and end time of the task respectively, defining a life cycle of the task, and $\Omega_{mo.type}$ represents a type of a monitoring object defined by the task.

In one or more embodiments of the present application, the traffic data warehouse construction apparatus first creates, when receiving a monitoring task creation instruction, a target monitoring task based on the monitoring task creation instruction. Then, a monitoring object corresponding to a monitoring object type parameter set in the target monitoring task is loaded, and a sampling unit set of the monitoring object is obtained. Next, a target monitoring task spatial range corresponding to a monitoring task spatial range parameter set in the target monitoring task is obtained. Later on, a spatial attribution relationship between a spatial range of each sampling unit in the sampling unit set and the target monitoring task spatial range is calculated. Then, a spatial coupling relationship between the monitoring object and the target monitoring task is determined according to the spatial attribution relationship. Then, a calculation label and task label of the monitoring object are set based on the spatial coupling relationship, and a labeled monitoring object is generated. Then, the labeled monitoring object is input to a preset monitoring calculation function, and a monitoring index calculation result is output. Finally, the monitoring index calculation result is configured in the labeled monitoring object, and the configured monitoring object is distributed to a task database corresponding to the target monitoring task. In the present application, coupling relationships in a road network operation management service are reduced based on labeling, so that calculation requirements of different monitoring tasks for monitoring index data can be met flexibly at a background data layer, coupling problems in monitoring data calculation are solved, and system service efficiency is improved.

It can be understood by those of ordinary skill in the art that all or part of the processes in the method of the above-mentioned embodiment may be completed by a computer program by instructing related hardware. The program may be stored in a computer-readable storage medium. When the program is executed, the processes of each of the above-mentioned method embodiments may be included. The storage medium storing the program may be a magnetic disk, an optical disk, a ROM, a RAM, etc.

The above is only partial embodiment of the present application and certainly not intended to limit the scope of the present application. Therefore, equivalent variations made according to the claims of the present application also fall within the scope of the present application.

The invention claimed is:

1. A traffic data warehouse construction method, comprising:

creating, when a monitoring task creation instruction is received, a target monitoring task based on the monitoring task creation instruction;

loading a monitoring object corresponding to a monitoring object type parameter set in the target monitoring task, and obtaining a sampling unit set of the monitoring object;

obtaining a target monitoring task spatial range corresponding to a monitoring task spatial range parameter set in the target monitoring task;

calculating a spatial attribution relationship between a spatial range of each sampling unit in the sampling unit set and the target monitoring task spatial range;

determining a spatial coupling relationship between the monitoring object and the target monitoring task according to the spatial attribution relationship;

setting a calculation label and task label of the monitoring object based on the spatial coupling relationship, and generating a labeled monitoring object;

inputting the labeled monitoring object to a preset monitoring calculation function, and outputting a monitoring index calculation result; and configuring the monitoring index calculation result in the labeled monitoring object, and distributing the configured monitoring object to a task database corresponding to the target monitoring task.

2. The method of claim 1, wherein the calculating a spatial attribution relationship between a spatial range of each sampling unit in the sampling unit set and the target monitoring task spatial range comprises:

obtaining a first spatial attribute description of the target monitoring task spatial range;

obtaining a second spatial attribute description of each sampling unit in the sampling unit set; and labeling each sampling unit as belonging to the target monitoring task when the second spatial attribute description belongs to the first spatial attribute description.

3. The method of claim 1, wherein the calculating a spatial attribution relationship between a spatial range of each sampling unit in the sampling unit set and the target monitoring task spatial range comprises:

obtaining a first spatial attribute description of the target monitoring task spatial range;

obtaining a second spatial attribute description of each sampling unit in the sampling unit set when the first spatial attribute description of the target monitoring task spatial range is a first geometric figure, the second spatial attribute description comprising a second geometric figure, and the geometric feature comprising points, lines, and planes;

inputting the first geometric figure and the second geometric figure to a preset correlation judgment function, and outputting a judgment result; and labeling each sampling unit as belonging to the target monitoring task when the judgment result is true.

4. The method of claim 1, wherein the determining a spatial coupling relationship between the monitoring object and the target monitoring task according to the spatial attribution relationship comprises:

determining that the monitoring object and the target monitoring task are spatially uncoupled when the spatial range corresponding to each sampling unit does not belong to the target monitoring task spatial range; or, determining that the monitoring object and the target monitoring task are spatially coupled when the spatial range corresponding to each sampling unit belongs to the target monitoring task spatial range; or, determining that the monitoring object and the target monitoring task are partially spatially coupled when the spatial range corresponding to at least one sampling unit belongs to the target monitoring task spatial range.

5. The method of claim 1, wherein the setting a calculation label and task label of the monitoring object based on the spatial coupling relationship comprises:

when the monitoring object and the target monitoring task are spatially coupled, obtaining the task label of the monitoring object, and adding the target monitoring task to the task label of the monitoring object;

or, when the monitoring object and the target monitoring task are partially spatially coupled, obtaining a sampling unit set corresponding to a part coupled with the target monitoring task in the monitoring object, and generating a target monitoring object, setting a task label of the target monitoring object as that of the target monitoring task, and updating a calculation label of a sampling unit corresponding to the target monitoring object.

6. The method of claim 1, further comprising:

obtaining a life cycle set in the target monitoring task, the life cycle comprising begin time of the task and end time of the task; and clearing a task label in the task label in the configured monitoring object when the end time is consistent with current time.

7. The method of claim 1, wherein the creating, when a monitoring task creation instruction is received, a target monitoring task based on the monitoring task creation instruction comprises:

extracting a plurality of parameters contained in the monitoring task creation instruction when the monitoring task creation instruction is received;

obtaining a preset monitoring task defining template; and associating the plurality of parameters with an Identifier (ID) in the monitoring task defining template to generate the target monitoring task, the monitoring task defining template being tsk=⟨ id, ($t_{bgn}$, $t_{end}$), $\Omega_{mo.type}$, TSD⟩ , where id uniquely identifies a monitoring task tsk, ($t_{bgn}$, $t_{end}$) represent begin time and end time of the task respectively, defining a life cycle of the task, $\Omega_{mo.type}$ represents a type of a monitoring object defined by the task, and TSD represents a spatial range parameter.

8. The method of claim 1, wherein the monitoring object is mo=⟨ id, type, name, SD, MI, TT⟩ , where id uniquely identifies the monitoring object; type represents a type of the monitoring object; name represents a name of the monitoring object;

SD=(admin, road, coord, . . . ) represents a spatial attribute description set of the monitoring object, where admin represents a description of an administrative region that the object belongs to, road represents a name of a road where the object is located, and coord represents a description of a Geographic Information System (GIS) attribute of the object;

MI=($\delta_1$, $\delta_2$, . . . , $\delta_k$) represents a monitoring index set of the monitoring object, there being a fixed index set for each type of monitoring objects; and TT=($tsk_1$, $tsk_2$, . . . , $tsk_m$) represents the task label corresponding to the monitoring object.

9. The method of claim 1, wherein the monitoring task creation instruction is an instruction input to a client, and the instruction contains a plurality of parameters for creation of the monitoring task.

10. The method of claim 9, wherein the plurality of parameters for creation of the monitoring task comprise an ID of the monitoring task, a life cycle parameter of the monitoring task, a type parameter of the monitoring object in the monitoring task, and a spatial range parameter of the monitoring task.

11. The method of claim 10, wherein all monitoring objects are stored in a monitoring object library.

12. The method of claim 1, wherein a type of the monitoring object comprises a congestion sensor or a flow sensor.

13. The method of claim 7, wherein a task database is configured for the monitoring task, which stores monitoring object index data corresponding to each monitoring task.

14. The method of claim 8, wherein the sampling unit set corresponding to the monitoring object is $\Omega_{mo}$, the spatial range of each sampling unit su in $\Omega_{mo}$ is represented as su.SD, and the target monitoring task spatial range is represented as tsk.TSD.

15. The method of claim 1, wherein the monitoring calculation function is $$mo.\delta_k = F^{\delta_k}_{mo.type,su.type}(\Omega_{mo}),$$

where mo.type represents a type of the monitoring object, su.type represents a type of the sampling unit, $\Omega_{mo}$ represents the sampling unit set of the monitoring object mo, and $\delta_k$ represents a monitoring index set of the monitoring object.

16. A computer storage medium storing a plurality of instructions suitable for a processor to load and execute to implement the blocks of the method of claim 1.

17. A terminal comprising a processor and a memory, wherein the memory stores a computer program suitable for the processor to load and execute to implement the blocks of the following traffic data warehouse construction method:

creating, when a monitoring task creation instruction is received, a target monitoring task based on the monitoring task creation instruction;

loading a monitoring object corresponding to a monitoring object type parameter set in the target monitoring task, and obtaining a sampling unit set of the monitoring object;

obtaining a target monitoring task spatial range corresponding to a monitoring task spatial range parameter set in the target monitoring task;

calculating a spatial attribution relationship between a spatial range of each sampling unit in the sampling unit set and the target monitoring task spatial range;

determining a spatial coupling relationship between the monitoring object and the target monitoring task according to the spatial attribution relationship;

setting a calculation label and task label of the monitoring object based on the spatial coupling relationship, and generating a labeled monitoring object;

inputting the labeled monitoring object to a preset monitoring calculation function, and outputting a monitoring index calculation result; and configuring the monitoring index calculation result in the labeled monitoring object, and distributing the configured monitoring object to a task database corresponding to the target monitoring task.

18. The terminal of claim 17, wherein the calculating a spatial attribution relationship between a spatial range of each sampling unit in the sampling unit set and the target monitoring task spatial range comprises:

obtaining a first spatial attribute description of the target monitoring task spatial range;

obtaining a second spatial attribute description of each sampling unit in the sampling unit set; and labeling each sampling unit as belonging to the target monitoring task when the second spatial attribute description belongs to the first spatial attribute description.

19. The terminal of claim 17, wherein the calculating a spatial attribution relationship between a spatial range of each sampling unit in the sampling unit set and the target monitoring task spatial range comprises:

obtaining a first spatial attribute description of the target monitoring task spatial range;

obtaining a second spatial attribute description of each sampling unit in the sampling unit set when the first spatial attribute description of the target monitoring task spatial range is a first geometric figure, the second spatial attribute description comprising a second geometric figure, and the geometric feature comprising points, lines, and planes;

inputting the first geometric figure and the second geometric figure to a preset correlation judgment function, and outputting a judgment result; and labeling each sampling unit as belonging to the target monitoring task when the judgment result is true.

20. The terminal of claim 17, wherein the determining a spatial coupling relationship between the monitoring object and the target monitoring task according to the spatial attribution relationship comprises:

determining that the monitoring object and the target monitoring task are spatially uncoupled when the spatial range corresponding to each sampling unit does not belong to the target monitoring task spatial range; or determining that the monitoring object and the target monitoring task are spatially coupled when the spatial range corresponding to each sampling unit belongs to the target monitoring task spatial range; or determining that the monitoring object and the target monitoring task are partially spatially coupled when the spatial range corresponding to at least one sampling unit belongs to the target monitoring task spatial range.

* * * * *